United States Patent [19]

Kroeger et al.

[11] Patent Number: 5,090,830
[45] Date of Patent: Feb. 25, 1992

[54] PRINTER HAVING SINGLE CONNECTOR FOR PARALLEL AND SERIAL INTERFACES

[75] Inventors: Wilbert L. Kroeger, Lexington, Ky.; John R. Ripley; Bruce R. Wood, both of Austin, Tex.

[73] Assignee: Lexmark International, Inc., Greenwich, Conn.

[21] Appl. No.: 506,515

[22] Filed: Apr. 6, 1990

Related U.S. Application Data

[63] Continuation of Ser. No. 363,560, May 22, 1989, abandoned, which is a continuation of Ser. No. 164,925, Mar. 7, 1988, abandoned.

[51] Int. Cl.⁵ .................................................. G06F 3/12
[52] U.S. Cl. ..................................... 400/719; 400/76; 395/325
[58] Field of Search ............... 400/61, 62, 76, 719; 364/519

[56] References Cited

U.S. PATENT DOCUMENTS

| | | | |
|---|---|---|---|
| 4,426,166 | 1/1984 | Bowling | 400/62 |
| 4,538,933 | 9/1985 | Imaizumi et al. | 400/582 |
| 4,595,804 | 6/1986 | MacConnell | 400/692 |
| 4,763,135 | 8/1988 | Shimode et al. | 400/120 |

FOREIGN PATENT DOCUMENTS 0158484 7/1986 Japan .................................. 400/61

OTHER PUBLICATIONS

VT 100 User Guide Jun. 1981 pp. 24–25.
EIA Standard RS–232–C, Aug. 1969, pp. 8, 28 and Section 5 Through Figure 5.2.
Manual for Texas Instruments Model 855 Printer pp. 3-4 to 3-7.
Manual for Diablo Models 630 API/API ECS Communications Terminals, title page and p. 36.

*Primary Examiner*—David A. Wiecking
*Assistant Examiner*—Steven S. Kelley
*Attorney, Agent, or Firm*—John A. Brady

[57] ABSTRACT

A selection of signals, each to one of a limted number of contacts, achieves both parallel and serial interfaces using a single connector. The connector has individual contacts for the following signals for parallel communications: strobe, data signals, acknowledge, busy, printer out of paper, printer selected, paper feed one line after printing, logic ground, chassis ground, initialize the printer controller, and printer error; and has individual contacts for the following signals for serial communications: transmit data, request to send, logic ground, receive data, data terminal ready, data set ready, and clear to send.

3 Claims, 1 Drawing Sheet

PRINTER HAVING SINGLE CONNECTOR FOR PARALLEL AND SERIAL INTERFACES

CONTINUATION APPLICATION

This application is a continuation of application Ser. No. 363,560, now abandoned, filed May 22, 1989, which is a continuation of application Ser. No. 164,925 filed Mar. 7, 1988, now abandoned.

TECHNICAL FIELD

This invention relates to cable connections to communicate with printers and the like. Such connections may be by parallel or serial modes of communication. A single connector may be provided comprising contacts to service both parallel and serial modes, although separate connectors for the parallel mode and the serial mode are usually employed at this time.

BACKGROUND ART

This invention is directed to a single connector having terminal selections for a printer used for word processing or other microcomputer output. Two such connectors are known in the prior art, both known as incorporated in commercially sold printers.

The Texas Instruments Model 855 printer is understood to have a single connector with contacts carrying most of the signals used in accordance with this invention. The serial interface contacts differ from those of this invention in not having a Request to Send signal contact and in not having a Clear to Send signal contact and in having a Secondary Request to Send signal contact, a contact not necessarily employed in this invention. This prior art also has some differences in its parallel and other signals. These prior art signals are shown in detail in the body of this specification.

The Diablo Models 630 API/API ECS Communications Terminals have a connector of 50 contacts providing two parallel modes of communication and one serial mode of communication. These serial connectors do not include Request to Send and Clear to Send, contacts which are employed in the subject invention. (It does have a constant 12 volt signal on its pin 23 which is interpreted as a Request to Send signal.) This prior art also has some differences in its parallel and other signals. These prior art signals are shown in detail in the body of this specification.

The Electronic Industries Association (EIA) standard for the RS-232-C serial interface recognizes limited sets of signals, denominated Interface Types, for different communication systems. The set of serial signals in accordance with this invention is very similar to the Type D interface, a duplex interface, but the Type D interface, in addition to requiring all of the serial signals employed in the preferred embodiment of this invention except Data Terminal Ready, requires an additional signal, the Received Line Signal Detector. The Type D interface also specifies Data Terminal Ready and Ring Detector as additional signals for Switched Service. The Type x interface of the EIA standard requires Signal Ground with all other signals being specified for the specific purpose. The set of serial signals in accordance with this invention therefore may be considered a Type x interface under the EIA standard.

An alternative to the use of separate contacts for each mode of communication as employed with this invention is to physically switch the contacts between circuits for parallel communication and circuits for serial communication, so that all of the contacts can be used in both the modes of communication. This is unacceptably expensive, however, and poses potential problems in space availability and mechanical reliability. In accordance with this invention circuits specific for the purpose of each contact are permanently connected to the contact and all are powered to an operating status when the printer is powered for operation. Thus, typically, a parallel contact may be brought to zero or plus +5 volts and a serial contact is brought to between −3 volts to −15 volts or to between +3 volts to +15 volts. Since the circuit levels are different, a contact having circuits to receive for example, parallel signals ordinarily would not respond to transmitted serial signals, which vary across a much wider range than the parallel signals.

DISCLOSURE OF INVENTION

In accordance with this invention a selection of signals, each on one of a limited number of contacts, defines both parallel and serial interfaces satisfactory for many printers. The parallel signals are suitable for a broad range of modes generally denominated as Centronics compatible. Similarly, the serial signals are suitable for applications compatible with the Electronic Industries Association RS-232-C standard interface.

A printer in accordance with this invention has a single cable connection for both parallel and serial data communication having individual contacts for the following signals for parallel communications: strobe, data signals, acknowledge, busy, printer out of paper, printer selected, logic ground, initialize the printer controller, and printer error; and having individual contacts for the following signals for serial communications: transmit data, request to send, logic ground, receive data, data terminal ready, data set ready, and clear to send.

This invention is a selection of contact designations to define a single interface connector which is suitable for both serial and parallel data transfer for many common applications. This avoids the expense and the space requirements on the printer of two, separate connectors.

A particular design objective and resulting important advantage of this invention is that an existing parallel communications cable may be used without modification with a printer employing this invention. That is a cable having twenty-five contacts for connection to personal computers of the general kind sold in large numbers in previous years by the assignee of this invention. That previous cable has a connector with thirty-six contacts for connection to the printer. Several of the thirty-six contacts are simply not used (often designed as non-connection or N.C.). Others are connected to ground. Internally, the cable has thirty wires, thirteen of which are connected to ground to more widely distribute ground. This cable may be used unchanged with the preferred embodiment of this invention described below. The signals connected to each pin of the twenty-five signal contact are shown in detail in the body of this specification.

BRIEF DESCRIPTION OF THE DRAWINGS

The details of this invention will be described in connection with the accompanying drawing, in which.

BEST MODE FOR CARRYING OUT THE INVENTION

Figure 1:
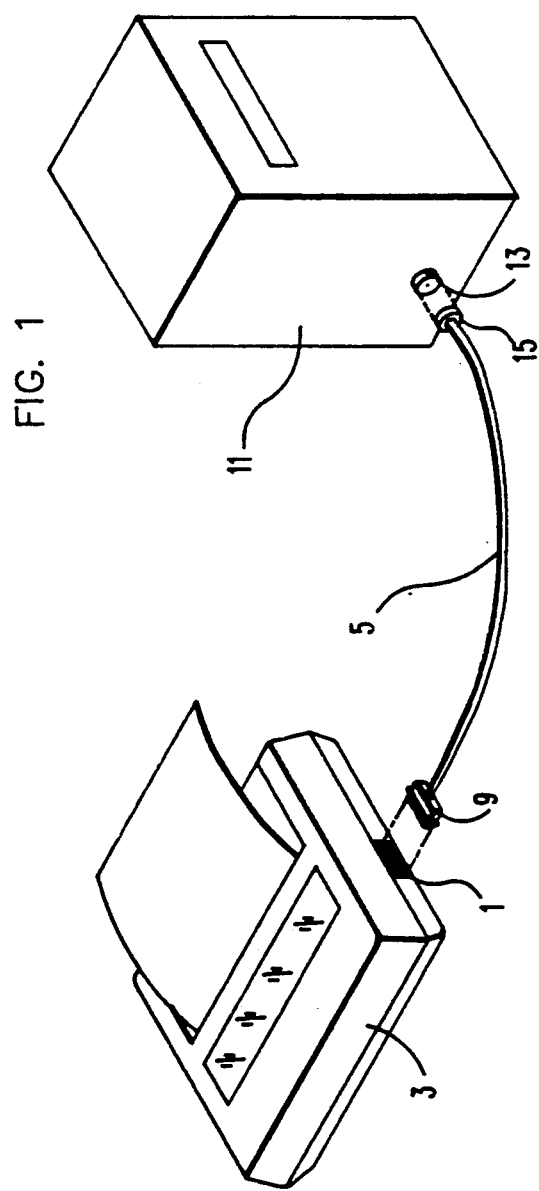
FIG. 1 illustrates a printer connected to a host data processor and FIG. 2 illustrates in more detail the printer connector and the associated cable connector.
Figure 2:
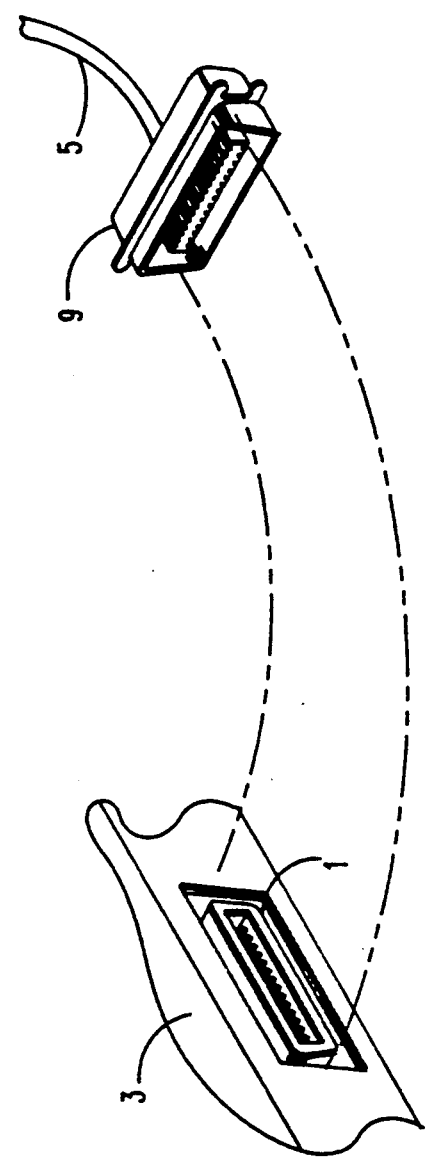

A selection of signals applied to a 36 pin connector achieves both parallel and serial interfaces satisfactory for printer applications using Centronics compatible parallel modes and the RS-232 serial modes. As illustrated in the drawing, single connector unit 1 exists at a printer 3, so that a typical cable 5 attached to the printer would be attached to the 36 pins by a cable terminal connector 9 on one end of cable 5. The printer is controlled from a host or system processor 11 conventionally by signals transmitted on cable 5. Processor 11 similarly has a connector 13 attached to cable 5 by a cable terminal connector 15 at the end of cable 5 opposite connector 9. Any standard mating connectors 1 and 9 and mating connectors 13 and 15 for a cable 5 are satisfactory, although a cable 5 for use in one mode of communication need not have actual connections to pins or contacts which used only for another mode of communication.

PIN DESIGNATIONS

Pin or sockets contacts in two parallel columns are commonly numbered in sequence with one column having contacts number 1 through 18 and the second column having contacts 19 through 36, with contact 1 adjacent contact 19 and contact 18 adjacent contact 36. Thus, for the 36 pin connector 1, the numbering is as shown in the following Table 1:

TABLE 1

| Signal Pin Numbers | |
| --- | --- |
| 1 | 19 |
| 2 | 20 |
| 3 | 21 |
| 4 | 22 |
| 5 | 23 |
| 6 | 24 |
| 7 | 25 |
| 8 | 26 |
| 9 | 27 |
| 10 | 28 |
| 11 | 29 |
| 12 | 30 |
| 13 | 31 |
| 14 | 32 |
| 15 | 33 |
| 16 | 34 |
| 17 | 35 |
| 18 | 36 |

Such numbering of contact or pin assignments should be understood in the subsequent description of this invention unless otherwise specified. The preferred embodiment of this invention employs a 36 terminal connector 1 of two parallel columns in accordance with Table 1.

PREFERRED EMBODIMENT

Table 2 illustrates the signal selection on each pin or contact of a single connector on the printer of the preferred embodiment of this invention. The left column lists the pin number (the pins on the printer are in parallel columns in accordance with Table 1). The next column states the use of the pin as either in parallel or serial communication (or in both modes for logic ground). The middle column contains an abbreviation or short name for the signal carried, these being explained or elaborated on below. The next column states the destination of the signal. An "In" signal originates from the other terminal and "Out" signal originates from the printer. (Thus, an "Out" signal originates with a printer and is responded to by a data processor connected to the printer by a cable connected to the pins 1-36, or so many of them as required for the mode of parallel or serial communications being employed.) Finally, the right column is somewhat longer description of the function of the signal.

TABLE 2

| | | Connector Pin Assignments | | |
| --- | --- | --- | --- | --- |
| SIGNAL PIN NO. | USE OF PIN | SIGNAL NAME | SIGNAL DESTINATION | SIGNAL FUNCTION |
| 1 | P | Strobe | In | STROBE - Pulse to read data in. |
| 2 | P | Data1 | In | Data bit of byte transferred. |
| 3 | P | Data2 | In | Data bit of byte transferred. |
| 4 | P | Data3 | In | Data bit of byte transferred. |
| 5 | P | Data4 | In | Data bit of byte transferred. |
| 6 | P | Data5 | In | Data bit of byte transferred. |
| 7 | P | Data6 | In | Data bit of byte transferred. |
| 8 | P | Data7 | In | Data bit of byte transferred. |
| 9 | P | Data8 | In | Data bit of byte transferred. |
| 10 | P | ACKNLG | Out | Acknowledges data has been received. |
| 11 | P | Busy | Out | Printer cannot receive data. |
| 12 | P | PE | Out | Printer is out of paper. |
| 13 | P | SLCT | Out | Printer is selected. |
| 14 | Note A (P) | Auto Feed XT | In | Paper is fed one line after printing |
| 15 | S | TD | Out | Transmit Data |
| 16 | P,S | GND | | Logic ground level. |
| 17 | Note B (P) | Chassis GND | | Printer chassis ground. |
| 18 | S | RTS | Out | Request to Send |
| 19-30 | P,S | GND | | Logic ground level. |
| 31 | P | INIT | In | Initialize the printer controller |
| 32 | P | Error | Out | Printer error. |

TABLE 2-continued

Connector Pin Assignments

| SIGNAL PIN NO. | USE OF PIN | SIGNAL NAME | SIGNAL DESTINATION | SIGNAL FUNCTION |
|---|---|---|---|---|
| 33 | S | RD | In | Receive Data |
| 34 | S | DTR | Out | Data Terminal Ready |
| 35 | S | DSR | In | Data Set Ready |
| 36 | S | CTS | In | Clear to Send |

Note A: Pin 14 has no connection in the preferred printer. It is therefore electrically compatible with the Auto Feed XT signal, and pin 14 is considered reserved for that signal conceptually, but not used Note B: Pin 17 has no connection in the preferred printer Chassis ground is normally used for radiation shielding, which is achieved differently in the preferred printer. No connection is compatible with ground, and pin 17 is considered reserved for that signal conceptually, but not used.

Selection of the parallel or serial mode is by manual switch setting in the printer or by logic sent by the host processor 11, as is conventional.

The following describes these signals in further detail. Voltage levels, timing, printer functions, and other details should be considered as illustrative of a typical application, since this invention is essentially directed to the general content of each signal assigned to a pin, not the details of electrical implementation.

$\overline{\text{STROBE}}$ (Pin 1) - Parallel Mode Use

The $\overline{\text{STROBE}}$ pulse causes the printer to latch, the data. The pulse width must be more than 0.5 microseconds at the printer. The signal level is normally high, the data is read at the low level of the signal.

DATA1 - DATA8 (Pins 2 through 9) - Parallel Mode Use

These signals represent the information of the first to eighth bits of parallel data respectively. Each signal is at a high level to represent a binary one and at a low level to represent a zero. The minimum setup time, measured from the high to low edge of $\overline{\text{STROBE}}$, is 0.5 microseconds. The minimum data hold time measured, from the low to high edge of $\overline{\text{STROBE}}$ is 0.5 microseconds.

$\overline{\text{ACKNLG}}$ (Pin 10) - Acknowledge - Parallel Mode Use

The $\overline{\text{ACKNLG}}$ signal indicates that the printer has received the data. The pulse is low active, and is approximately 5.0 microseconds in duration.

BUSY (Pin 11)

A high signal on the BUSY line indicates that the printer cannot receive data. This will be due to any of the following:

A data byte has just been received by the printer. (If busy is low, it will transition from low to high 0.5 microseconds maximum after a high to low transition on $\overline{\text{SROBE}}$).

During printer initialization (after an $\overline{\text{INIT}}$ signal)

Whenever the print buffers of the printer become full and the printer is unable to receive data. In this case BUSY will stay high from $\overline{\text{STROBE}}$ until the printer is able to accept more data.

Whenever the ERROR line is active.

When the printer is in the NOT READY state. The printer is placed in the NOT READY state by depressing the stop button on the control panel, or when an operator-intervention condition occurs such as PAPER ERROR.

PE (Pin 12) - Paper End - Parallel Mode Use

The Paper End signal is active high. The signal indicates that the printer has attempted to print a page of text and a paper feed, paper jam, or out paper condition exists.

SLCT (Pin 13) - Select Out - Parallel Mode Use

The Select Out signal is active high. It indicates that the printer is selected and may receive data. The printer is selected after software initialization, and after receipt of an ASCII DC1 (Select) control code. The printer may only be deselected via the Deselect or Positive Query software command. The printer does not receive and this ignores the $\overline{\text{SLCT IN}}$ line of the parallel interface.

$\overline{\text{AUTO FEED XT}}$ (Pin 14) - Automatic Paper Feed - Parallel Mode Use The $\overline{\text{AUTO FEED XT}}$ signal is active low. It places the printer in Auto Line Feed mode in which the printer will index one line space forward after each line end. (This pin is reserved for this function; however, it is not used in the preferred implementation.)

TRANSMIT DATA (Pin 15) - Serial Mode Use

Data is transmitted from the printer in a serial asynchronous conventional Mark/Space format on this line at the selected baud rate. This signal is held at Mark condition between characters when no data is being transmitted. Both Data Set Ready and Clear to Send must be ON for the printer to transmit.

GND (Pin 16) - Logic Ground - Parallel and Serial Mode Use

Pin 16 is tied to logic ground to establish a common reference for data and control signals.

CHASSIS GND (Pin 17) - Chassis Ground - Parallel Mode Use

Pin 17 is printer chassis ground. (This pin is reserved for this function; however, it is not used in the preferred implementation.)

REQUEST TO SEND (Pin 18) - Serial Mode Use

An ON condition indicates that the printer wishes to transmit data. This signal will be held ON by the printer at all times after initialization.

GND (Pins 19 to 30) - Logic Ground - Parallel and Serial More Use

Pins 19 to 30 are tied to logic ground to establish a common reference for data and control signals.

$\overline{\text{INIT}}$ (Pin 31) - Parallel Mode Use

The $\overline{\text{INIT}}$ line should be held low for a minimum of 50 microseconds. It does not force a hardware reset of the printer logic. When the $\overline{\text{INIT}}$ signal becomes active at a low level, the printer enters its $\overline{\text{INIT}}$ signal processing sequence. All buffered data is first printed. Then a software rest of all parameters to their power-on state is performed by the printer. At the completion of the $\overline{\text{INIT}}$ signal processing sequence, the printer will wait for the $\overline{\text{INIT}}$ line to return to a high level before accepting data from the host. The BUSY line is held active from the leading edge (high to low transition) of the $\overline{\text{INIT}}$ signal until all data has been printed and hardware and software initializations are complete.

$\overline{\text{ERROR}}$ (Pin 32) - Parallel Mode Use

The $\overline{\text{ERROR}}$ signal becomes active (low level) whenever the printer has detected a hardware error, or whenever an operator intervention condition exist such as out of paper. This signal is set 5 seconds after BUSY is set as a result of one of these conditions.

RECEIVE DATA (Pin 33) - Serial Mode Use

Data is received from the host in a serial asynchronous conventional Mark/Space format on this line at the selected baud rate. This signal must be held at Mark condition between characters and when no data is being transmitted. Data Set Ready must be ON for the printer to receive data.

DATA TERMINAL READY (Pin 34) - Serial Mode Use

An ON signal level indicates that the Power On Reset (POR) diagnostic routines of the printer have been executed successfully and that the printer is ready for transmission. When using DATA TERMINAL READY pacing, this signal will be ON when the printer's receive buffers may accept more data, and will be OFF when the printer's buffers are full. This signal will always be ON when using the XON/XOFF protocol.

DATA SET READY (Pin 35) - Serial Mode Use

The printer uses this signal to determine if the host system is attached and ready for transmission. This signal must be ON for the printer to transmit or receive data.

CLEAR TO SEND (Pin 36) - Serial Mode Use

An ON signal level indicates that the host is ready to receive data.

This set of parallel signals is electrically compatible with parallel interface common for many personal computers, specifically those computers which have what is generally termed the Centronics compatible interface. The data transfer rate is nominally 1000 characters per second (cps). Synchronization is by the STROBE pulse and coordination is by the ACKNLG and BUSY signal. Signal levels may be any level compatible with the circuitry employed, typically between zero volts and +5 volts.

This set of serial signals is electrically compatible with Electronic Industries Association (EIA) standard RS-232-C interface. These signals are identical in content to the signals of this standard but comprise a subset of all of assigned signals of different content of that standard. (The EIA standard signals are illustrated in detail in Table 4, the second table below.) The signals of the serial interface are contained in the same connector 1 as that of the parallel interface.

The format of the data as it is transmitted in the serial mode is as follows:

1 Start bit
8 Data bits (least significant bit transferred first)
0 or 1 Parity bit (switch or logic selectable)
2 or 1 Stop bits The signal levels of the serial interface are defined by the EIA standard and are as follows:

| Voltage Level | Control Lines | Data Lines |
|---|---|---|
| −15 v to −3 v | OFF | 1 (Mark) |
| −3 v to +3 v | undefined | undefined |
| +3 v to +15 v | OFF | 0 (Space) |

Serial Printer - Host Coordination

Three coordination protocols are used with EIA standard serial interfaces. A given printer-host connection may select one or more of these protocols by switch setting or logic so long as they are supported by both. These are the following:

DTR (DATA TERMINAL READY)

DTR pacing uses the Data Terminal Ready control signal to control the transfer of data from the host to the printer. When the signal is low (OFF), the printer's receive buffer is full and the host must stop transmitting. The printer can take 2 more bytes after the DTR signal is turned off. If the host sends more than 2 bytes, a host buffer overflow error will be generated. When the signal is high (ON), the printer's receive buffer may accept more data. The Data Set Ready signal should be ON for the printer to transmit or receive data.

HOST PACING

In Host Pacing the system ignores the responses from the printer and transmits data at a rate less than or equal to the capability of the printer to process that data. Host Pacing is not supported by a printer having a rate of processing data which is not function of the data alone. For example, a Form Feed control with sheet feed attached (requiring both eject and load operations) requires much more time than with continuous forms tractor attached (requiring only an index across the page boundary), and Host Pacing is not normally suitable in a system employing Form Feed.

XON/XOFF (Transmit On/Transmit Off, DC1/DC3)

The XON/XOFF pacing protocol uses the standard ASCII DC1 and DC3 control codes to pace the data flow from the host to the printer. The XOFF code is sent by the printer to the host to request that the host system stop transmitting data. The printer can take 128 more bytes after XOFF, but if the host sends more than 128 bytes, then a host buffer overflow error is generated. The XOFF will be issued when the following conditions occur:

The printer's receive buffer is almost full. (When it goes from 129 to 128 bytes available.)

The printer detects an error conditon and an Error Reporting mode is not ON.

The printer is in an alarm condition intended to prevent host buffer overflow.

The XON code is sent by the printer to the host to request that the host start/resume transmitting data. It will be issued when the following conditions occur:

After POR, if Data Set Ready is ON, or when Data Set Ready goes from OFF to ON.

The printer's receive buffer is almost empty (when it goes from 225 to 226 bytes available).

After successful error recovery, if the printer is not in Error Reporting mode.

When the XON/XOFF protocol is in effect the state of the Clear to Send line is ignored by the printer (the printer will transmit even if the signal is not ON). The Data Set Ready signal should be ON for the printer to transmit or receive data.

36 PIN

TYPICAL PARALLEL ASSIGNMENTS

Table 3 below compares this invention, listed on the left, with four other typical 36 pin parallel connectors. Those pin assignments having as asterisk are used for the serial mode in this invention.

TABLE 3

| SIGNAL PIN NO. | PREFERRED EMBODIMENT | PRIOR ART 1 | PRIOR ART 2 | PRIOR ART 3 | PRIOR ART 4 |
|---|---|---|---|---|---|
| 1 | STROBĒ | STROBĒ | STROBĒ | STROBĒ | STROBĒ |
| 2 | DATA1 | DATA1 | DATA1 | DATA1 | DATA1 |
| 3 | DATA2 | DATA2 | DATA2 | DATA2 | DATA2 |
| 4 | DATA3 | DATA3 | DATA3 | DATA3 | DATA3 |
| 5 | DATA4 | DATA4 | DATA4 | DATA4 | DATA4 |
| 6 | DATA5 | DATA5 | DATA5 | DATA5 | DATA5 |
| 7 | DATA6 | DATA6 | DATA6 | DATA6 | DATA6 |
| 8 | DATA7 | DATA7 | DATA7 | DATA7 | DATA7 |
| 9 | DATA8 | DATA8 | DATA8 | DATA8 | DATA8 |
| 10 | ACKNLḠ | ACKNLḠ | ACKNLḠ | ACKNLḠ | ACKNLḠ |
| 11 | BUSY | BUSY | BUSY | BUSY | BUSY |
| 12 | PE | PE | PE | PE | PE |
| 13 | SELECT OUT | SELECT OUT | SELECT OUT | SELECT OUT | SELECT OUT |
| 14 | AUTO FEED XT̄ | AUTO FEED XT̄ | AUTO FEED XT̄ | N.C. | N.C. |
| 15 | * TRANSMIT DATA | N.C. | N.C. | N.C. | N.C. |
| 16 | * GND | GND | GND | GND | GND |
| 17 | CHASSIS GND | CHASSIS GND | CHASSIS GND | CHASSIS GND | CHASSIS GND |
| 18 | * RTS | N.C. | N.C. | N.C. | N.C. |
| 19 | * GND | GND | GND | GND | GND |
| 20 | * GND | GND | GND | GND | GND |
| 21 | * GND | GND | GND | GND | GND |
| 22 | * GND | GND | GND | GND | GND |
| 23 | * GND | GND | GND | GND | GND |
| 24 | * GND | GND | GND | GND | GND |
| 25 | * GND | GND | GND | GND | GND |
| 26 | * GND | GND | GND | GND | GND |
| 27 | * GND | GND | GND | GND | GND |
| 28 | * GND | GND | GND | GND | GND |
| 29 | * GND | GND | GND | GND | GND |
| 30 | * GND | GND | GND | GND | GND |
| 31 | ĪNĪT | ĪNĪT | ĪNĪT | ĪNĪT | ĪNĪT |
| 32 | ERROR̄ | ERROR̄ | ERROR̄ | ERROR̄ | ERROR̄ |
| 33 | * RECEIVE DATA | GND | GND | GND | GND |
| 34 | * DTR | N.C. | N.C. | N.C. | N.C. |
| 35 | * DSR | PULLUP TO +5V | PULLUP TO +5V | PULLUP TO +5V | PULLUP TO +5V |
| 36 | * CTS | SELECT IN̄ | SELECT IN̄ | GROUNDED | N.C. |

In Table 3:
N.C. indicates no connection, an unused terminal from the printer.

PULLUP TO +5 V, indicates a signal which can supply relatively high power at +5 volts to the host. It is typically used to provide a logical high signal to pull up required control signals to the host not provided by the printer.

SELECT IN is a negative logic signal from the host which selects the printer for reception. If this signal is high, the printer will ignore all data and control signals from the host. For normal operation this signal should be low. This signal is typically used in a network environment.

Parallel interfaces are not rigidly standardized. The preferred embodiment and all of the comparisons in Table 3 are parallel interfaces used with IBM personal computers. With respect to these comparisons, the preferred embodiment sacrifices a ground connection, which is a connection related to noise. However, several other ground connections remain. The PULLUP to +5V is rarely used. The SELECT IN provides information which is not needed in typical non-network attachment. Finally, the loss of the No Connections simply removes the option to use them in special applications.

EIA RS-232-C STANDARD

Table 4 below shows the EIA RS-232-C Standard, understood to have been an established standard since at least 1969. Those pin numbers carrying general content used in the preferred embodiment of this invention is shown in the fourth column. Since the Type D interface of this standard is considered the most similar to the selection of serial signals of this invention, signals in that interface are specifically noted in the fifth column of Table 4.

TABLE 4

| | | EIA STANDARD | | |
|---|---|---|---|---|
| SIGNAL PIN NO. | EIA DESIGNATION | DESCRIPTION | PREFERRED EMBODIMENT USES | EIA TYPE D |
| 1 | AA | Protective Ground | NO | Optional |
| 2 | BA | Transmitted Data | YES | YES |
| 3 | BB | Received Data | YES | YES |
| 4 | CA | Request to Send | YES | YES |
| 5 | CB | Clear to Send | YES | YES |
| 6 | CC | Data Set Ready | YES | YES |

TABLE 4-continued

EIA STANDARD

| SIGNAL PIN NO. | EIA DESIGNATION | DESCRIPTION | PREFERRED EMBODIMENT USES | EIA TYPE D |
|---|---|---|---|---|
| 7 | AB | Signal Ground (Common Return) | YES | YES |
| 9 | — | (Reserved for Data Set Testing) | NO | NO |
| 10 | — | (Reserved for Data Set Testing) | NO | NO |
| 11 | | Unassigned | | |
| 12 | SCF | Secondary Received Line Signal Detector | NO | NO |
| 13 | SCB | Secondary Clear to Send | NO | NO |
| 14 | SBA | Secondary Transmitted Data | NO | NO |
| 15 | DB | Transmission Signal | NO | t |
| 16 | SBB | Element Timing (DCE Source) | NO | |
| 17 | DD | Secondary Received Data | NO | NO |
| 18 | | Unassigned | | |
| 19 | SCA | Secondary Request to Send | NO | NO |
| 20 | CD | Data Terminal Ready | YES | s |
| 21 | CG | Signal Quality Detector | NO | NO |
| 22 | CE | Ring Indicator | | s |
| 23 | CH/CI | Data Signal Rate Selector (DTE/DCE Source) | NO | NO |
| 24 | DA | Transmit Signal Element Timing (DTE Source) | NO | t |
| 25 | | Unassigned | | | t - Additional Interchange Circuits required for Synchronous Channel
s - Additional Interchange Circuits required for Switched Service The PROTECTIVE GROUND, SIGNAL QUALITY DETECTOR, RING DETECTOR and DATA SIGNAL RATE SELECTOR are used with a modem, which is a modulator-demodulator set for long distance wire transmission. The SECONDARY signals are rarely used. The RECEIVED LINE SIGNAL DETECTOR and the SIGNAL ELEMENT TIMING signal are rarely if ever used in current applications.

Model 855 - Prior Art

Table 5 shows a detailed listing of the pin assignments of the prior art commercial product, Texas Instrument Model 855 printer. The right column indicates those pin numbers carrying general content used in the preferred embodiment of this invention. Those pin assignments having an asterisk are used for serial mode in the Model 855. Terminology used is consistent with the foregoing terminology where possible even though the manufacturer may use somewhat different terminology.

TABLE 5

| SIGNAL PIN NO. | SIGNAL | DESCRIPTION | PREFERRED EMBODIMENT USES |
|---|---|---|---|
| 1 | STROBE | STROBE - Pulse to read data in | YES |
| 2 | DATA1 | Data bit of byte transferred | YES |
| 3 | DATA2 | Data bit of byte transferred | YES |
| 4 | DATA3 | Data bit of byte transferred | YES |
| 5 | DATA4 | Data bit of byte transferred | YES |
| 6 | DATA5 | Data bit of byte transferred | YES |
| 7 | DATA6 | Data bit of byte transferred | YES |
| 8 | DATA7 | Data bit of byte transferred | YES |
| 9 | DATA8 | Data bit of byte transferred | YES |
| 10 | ACKNLG | Acknowledges data has been received | YES |
| 11 | BUSY | Printer cannot receive data | YES |
| 12 | PE | Printer is out of paper | YES |
| 13 | SLCT | Printer is selected | YES |

TABLE 5-continued

| SIGNAL PIN NO. | SIGNAL | DESCRIPTION | PREFERRED EMBODIMENT USES |
|---|---|---|---|
| 14 | TEST | used in factory testing. Source: host | NO |
| 15 | * READY/BUSY | Secondary request to send | NO |
| 16 | * BB RECEIVED DATA (RD) | Received Data | YES |
| 17 | (serial * AA PROTECTIVE and parallel) GROUND (PG) | Chassis ground | NO - Serial YES - Parallel |
| 18 | PULLUP TO +5V | +5 Volts dc | NO |
| 19 | (serial * LOGIC GND and parallel) paired with pin 1 | Logic ground level | YES** |
| 20 | SIGNAL GND paired with pin 2 | Logic ground level | YES** |
| 21 | SIGNAL GND paired with pin 3 | Logic ground level | YES** |
| 22 | SIGNAL GND paired with pin 4 | Logic ground level | YES** |
| 23 | SIGNAL GND paired with pin 5 | Logic ground level | YES** |
| 24 | SIGNAL GND paired with pin 6 | Logic ground level | YES** |
| 25 | SIGNAL GND paired with pin 7 | Logic ground level | YES** |
| 26 | SIGNAL GND paired with pin 8 | Logic ground level | YES** |
| 27 | SIGNAL GND paired with pin 9 | Logic ground level | YES** |
| 28 | SIGNAL GND paired with pin 10 | Logic ground level | YES** |
| 29 | SIGNAL GND paired with pin 11 | Logic ground level | YES** |
|  |  | ** Ground lines in cable ideally surrounding busy signal lines, not directly paired. |  |
| 30 | Not used for either Parallel or Serial Mode |  |  |
| 31 | INIT | Initialize the printer controller | YES |
| 32 | ERROR | Printer error | YES |
| 33 | * CC DATA SET READY (DSR) | Data Set Ready | YES |
| 34 | * CD DATA TERMINAL READY (DTR) | Data Terminal Ready | YES |
| 35 | * BA TRANSMIT DATA (TD) | Transmit Data | YES |
| 36 | SELECT IN | Select Printer For Reception (Negative Logic) | NO |

Model 630 - Prior Art

Table 6 shows a detailed listing of the pin assignment of the prior ar commercial products, Diablo Models 630 API/API ECS communications terminals. This has 50 pins and supports two parallel modes, as well as a RS-232-C. One of the parallel modes is a Centronics compatible mode. For that parallel mode and for the serial mode, the terminology used is consistent with the foregoing terminology where possible even though the manufacturer may use somewhat different terminology. For the other parallel mode, designated as IEEE-488, only the available short designations are used without further detail because such details of a non-Centronics compatible parallel mode are not believed relevant to this invention. The right column indicates those pin numbers carrying general content for the Centronic compatible interface and the serial interface used in the preferred embodiment of this invention. Terminology not in the foregoing discussion is understood to be terminology used by the manufacturer. Those pin assignments having an asterisk are used for serial mode in the Models 630.

TABLE 6

| SIGNAL PIN NO. | IEEE-488 PARALLEL | SERIAL AND CENTRONICS COMPATIBLE PARALLEL | DESCRIPTION FOR SERIAL & CENTRONICS COMPATIBLE PARALLEL | PREFERRED EMBODIMENT USES |
|---|---|---|---|---|
| 1 | — | PE | Printer is out of paper | YES |
| 2 | — | PULLUP TO +5V | +5 volts dc | NO |
| 3 | N/C* | — | — | — |
| 4 | N/C* | — | — | — |
| 5 | — | SELECT IN | Select printer for reception | NO |
| 6 | — | BUSY | Printer cannot receive data | — |
| 7 | $\overline{ATN}$ | — | — | — |
| 8 | — | $\overline{OPTION1}$ | Select a specific feature or mode | NO |
| 9 | $\overline{DATA2}$ | DATA2 | Data bit of byte transferred | YES |
| 10 | $\overline{DATA2}$ | DATA2 | Data bit of byte transferred | YES |
| 11 | $\overline{DATA3}$ | DATA3 | Data bit of byte transferred | YES |
| 12 | $\overline{DATA4}$ | DATA4 | Data bit of byte transferred | YES |
| 13 | $\overline{EOI}$ | — | — | — |
| 14 | $\overline{DAV}$ | $\overline{STROBE}$ | STROBE - Pulse to read | YES |
| 15 | $\overline{NRFD}$ | $\overline{ACKNLG}$ | Acknowledge data has been received | YES |
| 16 | $\overline{NDAC}$ | $\overline{DEMAND}$ | A priority signal | NO |
| 17 | $\overline{IFC}$ | $\overline{INPUT\ PRIME}$ | A timing signal | NO |
| 18 | $\overline{SRQ}$ | $\overline{ERROR}$ | Printer error | YES |
| 19 | $\overline{ATN}$ | $\overline{STROBE}$ | STROBE - Pulse to read | YES |
| 20 | SHIELD | — | — | — |
| 21 | N/C* | — | — | — |
| 22 | — | *(and parallel) PROTECTIVE GROUND | Chassis ground | No - Serial YES - Parallel |
| 23 | — | * PULLUP TO +12 (RTS) | +12 Volts dc | NO |
| 24 | — | * TRANSMIT DATA (RX Data) | Transmit Data | YES |
| 25 | — | * DATA TERMINAL<br>* DATA TERMINAL READY (DTR) | Data Terminal<br>Data Terminal Ready | YES<br>YES |
| 26 | — | * Signal GND | Logic ground level | YES |
| 27 | — | * Signal GND | Logic ground level | YES |
| 28 | — | * Signal GND | Logic ground level | YES |
| 29 | — | * Signal GND | Logic ground level | YES |
| 30 | — | * Signal GND | Logic ground level | YES |
| 31 | — | * Signal GND | Logic ground level | YES |
| 32 | — | $\overline{OPTION2}$ | Select a specific feature | NO |

TABLE 6-continued

| SIGNAL PIN NO. | IEEE-488 | SERIAL AND CENTRONICS COMPATIBLE PARALLEL | DESCRIPTION FOR SERIAL & CENTRONICS COMPATIBLE PARALLEL | PREFERRED EMBODIMENT USES |
|---|---|---|---|---|
| | | | or mode | |
| 33 | N/C (Key) | — | — | — |
| 34 | $\overline{DATA5}$ | DATA5 | Data bit of byte transferred | YES |
| 35 | $\overline{DATA6}$ | DATA6 | Data bit of byte transferred | YES |
| 36 | $\overline{DATA7}$ | DATA7 | Data bit of byte transferred | YES |
| 37 | $\overline{DATA8}$ | DATA8 | Data bit of byte transferred | YES |
| 38 | $\overline{REN}$ | — | — | — |
| 39 | GND | Signal GND | Logic ground level | YES |
| 40 | GND | Signal GND | Logic ground level | YES |
| 41 | GND | Signal GND | Logic ground level | YES |
| 42 | GND | Signal GND | Logic ground level | YES |
| 43 | GND | Signal GND | Logic ground level | YES |
| 44 | GND | Signal GND | Logic ground level | YES |
| 45 | Logic GND | Signal GND | Logic ground level | YES |
| 46 | — | Signal GND | Logic ground level | YES |
| 47 | — | * Signal GND | Logic ground level | YES |
| 48 | — | * RECEIVE DATA ($\overline{RX}$ DATA) | Receive data | YES |
| 49 | — | DATA SET READY | Data Set Ready (DSR) | Yes |
| 50 | N/C* (Key) | — | — | — |

Cable Alternatives

Typically, of course, the host computer or data processing system microprocessor 11 may be structured to communicate in only a serial or a parallel mode. A cable connector 15 at the processor 11 will have only as many pins or contacts as necessary for such communication. A cable 5 is therefore provided which attaches to a 36 pin connector 1 on one end, by cable connector 9. Processor 11 is connected by connector 13 through cable 5 with the communications interface connector 1 of the printer 3. Cable 5 has connector 15 at the end connected to processor 11 which is suitable to physically connect with the communications interface connector 13 at the processor 11, which may have a different configuration and number of pins or contacts than connector 1. Individual lines in cable 5 are connected a each end to contacts intended to communicate the same signal.

Thus, for parallel communications a cable 5 is provided having a connector 9 at one end which physically matches the 36 terminal connector 1 at printer 3. That cable 5 has pins or contacts positioned to connect to contacts 1 through 14, 16 through 17, 19 through 32 of the printer connector. Wires from these contacts extend through cable 5 to contacts at the opposite end of the cable 5 which are arranged to connect to the corresponding pin or contacts in the host connector 13, which may be in a different order and configuration from that of the printer. Similarly, for serial communications, a cable 5 is provided having a connector 9 at one end which physically matches the 36 terminal connector 1 at printer 3. That cable connector has contacts positioned to connect to contacts 15, 18 through 30, and 33 through 36 of the printer connector 1. Wires from these contacts extend through cable 5 to contacts at the opposite end of the cable 5 which are arranged to connect to the corresponding contacts in the host connector 13, which may be in a different order and configuration from that of printer 3. Individual wires in cable 5 may be simply rearranged along the length of cable 5 to have virtually any configuration at the ends of cable 5 without twisting any wire more that one revolution around the other wires. Of course, both printer connector 1 and host connector 13 could be identical, requiring no rearrangement.

An important advantage of this invention is that an existing, widely used parallel communication cable may be used directly and without modification with a printer employing this invention. That is a cable having twenty-five contacts for connection to personal computers sold in previous years in large numbers by the assignee of this invention. Table 7 shows the contacts of that cable both at the twenty-five contact connector (corresponding to 15 in the drawing) and at the other connector, a thirty-six contact connector (corresponding to 9 in the drawing). Signal names are used which correspond to that of Table 2. In accordance with this invention, a signal at the printer on pin 36 ($\overline{\text{SLCT IN}}$) is ignored in the parallel mode.

TABLE 7

| COMPUTER CONNECTOR PIN NUMBER | PRINTER CONNECTOR PIN NUMBER | SIGNAL NAME |
|---|---|---|
| 1 | 1 | $\overline{\text{STROBE}}$ |
| 2 | 2 | Data 1 |
| 3 | 3 | Data 2 |
| 4 | 4 | Data 3 |
| 5 | 5 | Data 4 |
| 6 | 6 | Data 5 |
| 7 | 7 | Data 6 |
| 8 | 8 | Data 7 |
| 9 | 9 | Data 8 |
| 10 | 10 | $\overline{\text{ACKNLG}}$ |
| 11 | 11 | Busy |
| 12 | 12 | PE |
| 13 | 13 | SLCT |
| 14 | 14 | $\overline{\text{AUTO FEED XT}}$ |
| 15 | 32 | $\overline{\text{ERROR}}$ |
| 16 | 31 | $\overline{\text{INIT}}$ |
| 17 | 36 | $\overline{\text{SLCT IN}}$ |
| 18 | 19 | GND |
| 19 | through | GND |
| 20 | 30 | GND |
| 21 | & | GND |
| 22 | 33* | GND |
| 23 | — | GND |
| 24 | — | GND |
| 25 | — | GND |
| Other Pins** | | No Connection |

*The cable has 30 wires. At the 36 pin connector, pins 19 through 30 are bused together. Thirteen of the 30 wires have logic ground. And the 25 pin connector, five of the ground pins connect to two different ones of the thirteen ground wires. Such wide distribution of ground wires is to minimize electrical noise.
**Pins 15, 16, 17, 18, 34 and 35 are not connected. Pin 16 is conceptually reserved for logic ground and pin 17 is conceptually reserved by chassis ground.

Variations from the preferred embodiment may be employed without departing from the basic aspects of this invention. In particular, the addition of further terminals and signals is immediately possible where the addition hardware is not burdensome. Accordingly, patent coverage should not be unduly limited, but should be as provided by law with reference to the following claims.

We claim:

1. A printer having integral with said printer for communication external of said printer one connector for a single cable, said printer communicating through said connector in a parallel mode and a serial mode of communication, said connector having no more than 36 effective contacts, said contacts being located in two adjacent columns and being assigned for purposes of reference as number 1 adjacent number 19 on one end of said columns, number 2 adjacent number 20 next in sequence in said columns, with numbers assigned to the other of said contacts likewise in sequence, and having individual contacts for the following signals used in said parallel mode of communication: strobe on contact 1, eight data signals on contacts 2 through 9, acknowledge on contact 10, busy on contact 11, printer out of paper on contact 12, printer selected on contact 13, logic ground on one or more of contact 16 and contacts 19 through 30, initialize the printer controller on contact 31, and printer error on contact 32; and also having individual contacts used in said serial mode of communication consisting only of the following signals for serial communications: transmit data on contact 15, request to send on contact 18, logic ground on one or more of contact 16 and contacts 19 through 30, receive data on contact 33, data terminal ready on contact 34, data set ready on contact 35, and clear to send on contact 36, all of said individual contacts except individual contacts used for ground being used only for one of said modes of communication, said printer in said parallel mode ignoring a parallel-mode signal on said contact for said clear to send signal.

2. A printer having integral with said printer for communication external of said printer one connector for a single cable, said printer communicating through said connector in a parallel mode and a serial mode of communication, said connector having no more than 36 effective contacts, said contacts being located in two adjacent columns and being assigned for purposes of reference as number 1 adjacent number 19 on one end of said columns, number 2 adjacent number 20 next in sequence in said columns, with numbers assigned to the other of said contacts likewise in sequence, and having individual contacts for the following signals used in said parallel mode of communication: strobe on contact 1, eight data signals on contacts 2 through 9, acknowledge on contact 10, busy on contact 11, printer out of paper on contact 12, printer selected on contact 13, logic ground on one or more of contact 16 and contacts 19 through 30, chassis ground on contact 17, initialize the printer controller on contact 31, and printer error on contact 32; and also having individual contacts used in said serial mode of communication consisting only on the following signals for serial communications: logic ground on one or more of contact 16 and contacts 19 through 30, transmit data on contact 15, request to send on contact 18, receive data on contact 33, data terminal ready on contact 34, data set ready on contact 35, and clear to send on contact 36, all of said individual contacts except individual contacts used for ground being used only for one of said modes of communication, said printer in said parallel mode ignoring a parallel-mode signal on said current for said clear to send signal.

3. A printer having integral with said printer for communication external of said printer one connector for a single cable, said printer communicating through said connector in a parallel mode and a serial mode of communication, said connector having no more than 36 effective contacts, said contacts being located in two adjacent columns and being assigned for purposes of reference as number 1 adjacent number 19 on one end of said columns, number 2 adjacent number 20 next in sequence in said columns, with numbers assigned to the other of said contacts likewise in sequence, and having individual contacts for the following signals used in said parallel mode of communication: strobe on contact 1, eight data signals on contacts 2 through 9, acknowledge on contact 10, busy on contact 11, printer out of paper on contact 12, printer selected on contact 13, paper feed one line after printing on contact 14, logic ground on one or more of contact 16 and contacts 19 through 30, chassis ground on contact 17, initialize the printer controller on contact 31, and printer error on contact 32; and also having individual contacts used in said serial mode of communication consisting only of the following signals for serial communications: transmit data on contact 15, request to send on contact 18, logic ground on one or more of contact 16 and contacts 19 through 30, receive data on contact 33, data terminal ready on contact 34, data set ready on contact 35, and clear to send on contact 36, all of said individual contacts except individual contacts used for ground being used only for one of said modes of communication, said printer in said parallel mode ignoring a parallel-mode signal on said contact for said clear to send signal.

* * * * *